Dec. 15, 1936.　　　R. A. SANDBERG　　　2,064,036
METHOD OF MAKING A CONDENSER
Filed Aug. 12, 1935　　　3 Sheets-Sheet 1
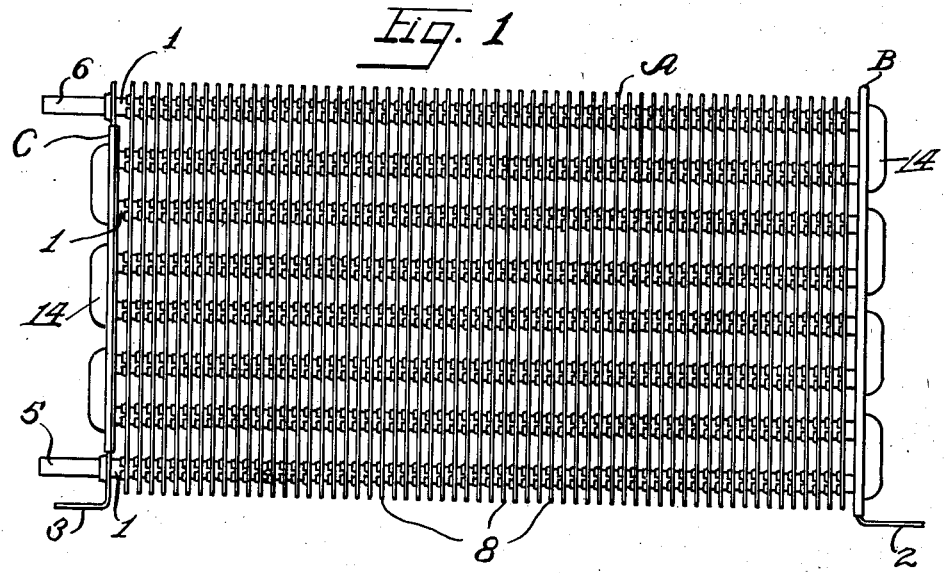
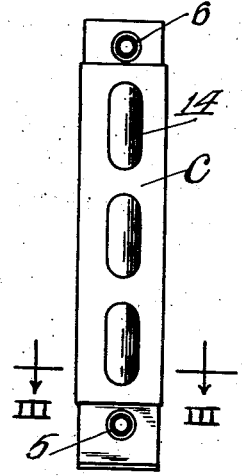
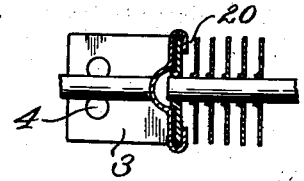
Inventor
Ray A. Sandberg
By Charles O'Neill Attys

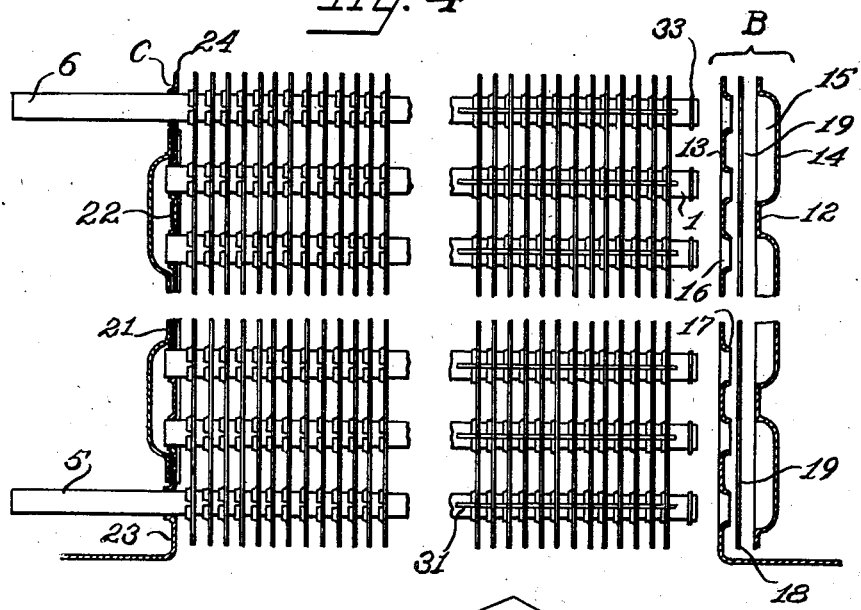
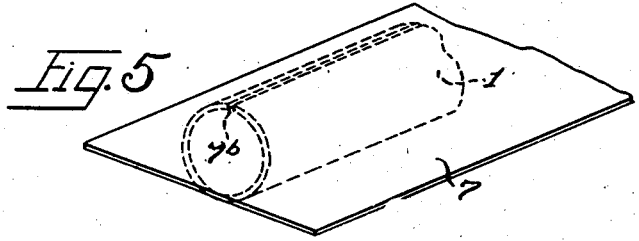
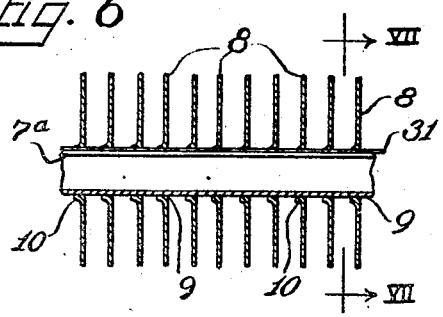 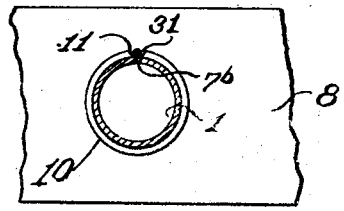

Dec. 15, 1936.       R. A. SANDBERG       2,064,036
METHOD OF MAKING A CONDENSER
Filed Aug. 12, 1935       3 Sheets-Sheet 3
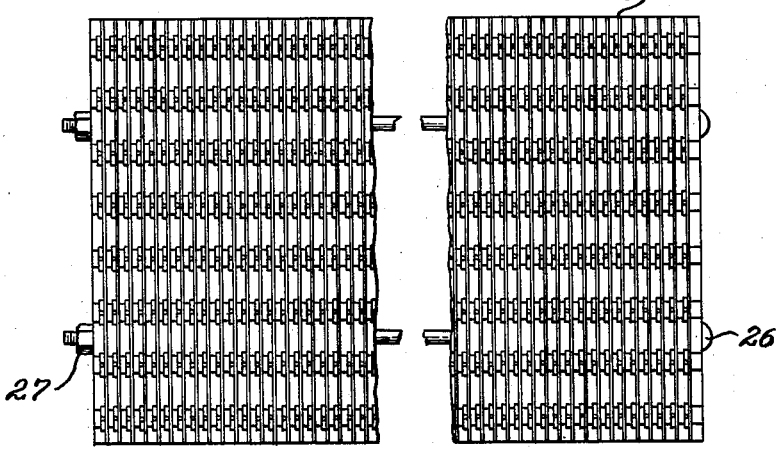
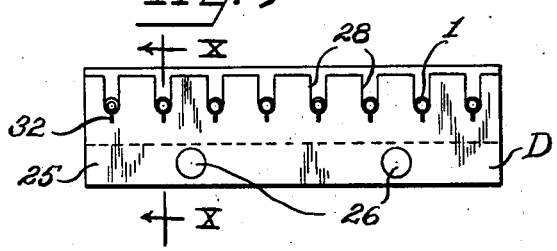
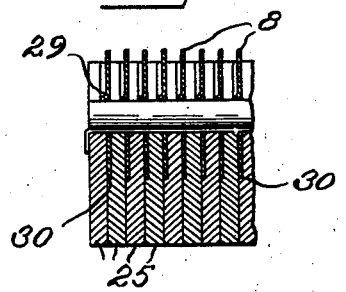
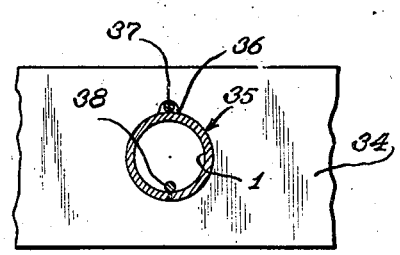
Inventor
Ray A. Sandberg Patented Dec. 15, 1936

2,064,036

UNITED STATES PATENT OFFICE 2,064,036

METHOD OF MAKING A CONDENSER

Ray A. Sandberg, Waukegan, Ill., assignor to Oakes Products Corporation, North Chicago, Ill., a corporation of Michigan Application August 12, 1935, Serial No. 35,765

2 Claims. (Cl. 113—118)

The present invention relates to a method of making a condenser, and more particularly to a condenser for use with electrical refrigerators.

Condensers for this purpose have heretofore been manufactured by a method that is relatively more expensive than the method here employed.

An object of the present invention is to provide a method for making condensers and for readily assembling heat radiating fins on refrigerant circulating tubes so as to secure firm joints of good heat conductivity between the fins and the tubes.

Another object of the present invention is to provide a method for the manufacture of condensers wherein the various parts and elements are first assembled and then a brazing operation is carried out automatically and in a single step.

The invention has for a further object the provision of a method of making condensers wherein the tubes are fashioned from flat sheets of suitable metal with the abutting margins of the tubular sheets brazed simultaneously with the brazing of the fins to the tubes.

Other and further important objects of the present invention will be apparent from the disclosure in the following specification and the accompanying drawings.

The accompanying drawings illustrate a condenser manufactured in accordance with the method of the present invention and the views thereof are as follows:

Figure 1 is a top plan view of a completed condenser manufactured in accordance with the principles of the present invention.

Figure 2 is an end elevation of the condenser of Figure 1 looking at the left-hand end of the same.

Figure 3 is a fragmental sectional view taken substantially along the line III—III of Figure 2.

Figure 4 is an enlarged, composite view, partially in elevation and partially in section, illustrating different stages in the assembly of the condenser.

Figure 5 is an isometric view of a fragmental portion of a sheet from which a tube is rolled, showing in dotted line the manner of rolling the sheet to form a tube and with the abutting edges forming a seam lengthwise of the tube.

Figure 6 is an enlarged fragmental sectional view taken substantially lengthwise of a tube to illustrate a step in the assembly of the heat radiating fins on a tube.

Figure 7 is an enlarged transverse sectional view taken substantially along the line VII—VII of Figure 6.

Figure 8 is a broken top plan view illustrating the assembly of the heat radiating bins in a form, holder or jig for assembly purposes.

Figure 9 is an end elevational view of the form or jig of Figure 8.

Figure 10 is an enlarged fragmental sectional view taken substantially along the line X—X of Figure 9.

Figure 11 is an enlarged fragmental elevational and sectional view of a fin and tube respectively, similar to Figure 7 and showing another manner of brazing the fins to the tubes and sealing the seams of the tubes.

The drawings will now be explained.

As illustrated in Figure 1, the reference character A indicates generally a condenser of the present invention, comprising a plurality of longitudinally extending tubes 1, joined at one end by a header B, and at the other end by a header C. Said headers B and C are provided with offset legs 2 and 3 respectively for securing the condenser to a suitable supporting wall or member. These offset portions 2 and 3, for this purpose, may be provided with one or more apertures 4. The tubes 1 along the outside margins of the condenser A extend beyond the header C to provide connections 5 and 6 to a refrigerant circulating system (not shown).

Referring to Fig. 5, the tubes of the present invention are preferably formed from flat sheet steel of appropriate length and width, strips 7 of which are subjected to a suitable forming operation to roll the strips into cylindrical form, as shown in dotted lines in Fig. 5. The abutting edges 7a of the strips, when rolled into tubular form, form seams 7b lengthwise of the tubes 1. The seams 7b of the tubes 1 are as tight as can be formed by the bending operation applied in the formation of the tubes.

A plurality of heat radiating fins 8 are formed of relatively thin sheet steel or other suitable metal and all are provided with as many apertures 9 as there are to be tubes 1. The apertures 9 are preferably formed by stamping or other suitable method. Some of the metal surrounding the apertures is bent outwardly from the faces of the fins to provide annular flanges or collars 10. The flanges 10 are, however, not continuous about the apertures 9 but are notched, as at 11 on either one side or opposite sides. These notches serve a purpose to be later described.

The construction of the header B as shown in detail in Fig. 4 comprises a pair of sheet metal plates consisting of an outer plate 12 and an inner plate 13. The outer plate 12 is embossed to provide a series of outwardly convex portions 14 forming internal communicating chambers 15 between adjacent tubes 1. The inner plate 13 is stamped or otherwise processed to provide regular openings or apertures 16 having annular arcuate flanges 17 for engagement with the ends of the tubes 1 when the parts are assembled.

In assembling the plates 12 and 13 to provide a header B, a shim 18 of brass or other suitable brazing metal is inserted between the plates 12 and 13 and is provided with apertures 19 of the form and size of the openings into the communicating chambers 15. Thus, when the shim 18 is inserted in place between the plates 12 and 13 the surfaces of the shim are in full contact with the unembossed portions of the two plates. One of the plates, such as the plate 12 is provided with marginal portions such as the portions 20 (Fig. 3) extending beyond the edges of the plate and adapted to be bent therearound to hold the plates 12 and 13 in assembled relation.

In the case of the header C, the outer plate 21 is constructed in the same manner as the outer plate 12 of the header B, except that it is not co-extensive in length with the inner sheet metal plate 22, but terminates short thereof to leave portions of the inner plate 22 extending therebeyond as at 23 and 24 to receive the tube extensions 6 and 5. The lateral edges of the outer plate 21 are bent about the corresponding edges of the inner plate 22, in the same manner as described with reference to the header B, to hold the plate in assembled relation prior to the brazing operation.

When assembling the condenser parts, the fins 8 are first inserted in a form, holder or jig indicated generally as D in Figs. 8, 9, and 10. Said holder or jig D Comprises a plurality of spacer plates 25 held together in assembled relation by means of rods 26 provided with nuts 27. Everyone of the spacer plates 25 is provided with a series of notches or slots 28 extending downwardly from the upper margin thereof and adapted to receive the tubes 1. Referring to Fig. 10, it will be observed that the upper faces of the spacer plates 25 are relieved as at 29 to permit the passage of the flanges or collars 10 surrounding the openings in the fins 8. Beyond the relieved portion 29 the corresponding faces of the spacer plates 25 are merely recessed as at 30 to the depth and extent required to receive the bottom portions of the fins 8.

By virtue of this construction, the fins 8 may be inserted between the spacer plates 25, with the apertures 9 of the fins all in alignment and with the fins held firmly in position. One series of the notches 11 in the flanges 10 surrounding the pin opening should be positioned at the bottoms of the slots 28, and in alignment, to permit the insertion therethrough of brazing wires 31. Said brazing wires 31 extend the full length of the form D and have their ends downturned as at 32 (Fig. 9) to prevent displacement of the wires during the subsequent insertion of the tubes 1.

The tubes 1 are then inserted through the aligned apertures in the several fins. Preferably the minimum diameters of the flanges 10 of the fins is slightly less than the exterior diameters of the tubes 1 to effect a tight fit of the fins on the tubes.

After the preliminary assembly of the tubes 1 and the fins 8, the temporary assembly is removed from the form or jig D ready to receive the headers B and C.

Surrounding the ends of the tubes 1 at the end of the assembly to receive the header B are single loops 33 of brazing wire, arranged with one loop per tube. The single loops 33 of brazing wire are so positioned about the ends of the tubes ready to receive the headers that when the headers are forced onto the ends of the tubes so that the tube ends extend into the flanged apertures 16 of the inner plates 13 and 22 respectively, the loops of wires 33 lie within the annular fillets formed between the flanges 17 and the walls of the ends of the tubes 1.

After the headers have been thus assembled, the condenser is ready for the brazing operation. Any suitable type of furnace may be used for carrying out this operation. Preferably, however, the assembled condensers are placed in an electric furnace having a reducing atmosphere, such as an atmosphere of hydrogen, and maintained at a temperature sufficiently high to melt the wires 31 and 33 to complete the brazing operation. Where brass is used as the brazing metal, temperatures of 1800 to 2000° F. may be used and slightly higher temperatures if copper is employed.

Due to capillary action, the molten brazing metal formed by melting down of the wires 31 and 33, flows into the seams 7b of the tubes 1, thus brazing the seams together and flows in and around the joints between the flanges 10 and the tubes 1 and also between the annular flanges 17 of the inner plates 13 and 22 respectively of the headers and the ends of the tubes 1. Simultaneously, the brazing shims 18 between the inner and outer plates of the headers are melted and flow between the adjacent flat surfaces of the inner and outer plates of the headers to cause these plates to be firmly brazed together. In this way, excellent thermal joints are formed between the various contacting surfaces of the tubes, fins and header walls. These various elements of the condenser are firmly and rigidly united into an integral whole. The use of steel for the tubes and fins although having a lower rate of heat transfer than copper is nevertheless justified by the lower cost of steel and the ease with which good thermal joints can be produced by the method described.

It will thus be apparent that the entire brazing operation is carried automatically and in a single step thereby eliminating the necessity for manually performing separate brazing operations. The brazing of the condenser in the manner described causes simultaneous closing of the seams of the tubes and the brazing of the fins to the tubes, as well as the brazing of the headers to the tubes. This in itself effects a considerable saving in time and expense. Furthermore, better thermal joints between the walls of the tubes and the fins are obtained than could be secured by forced fit or other mechanical methods designed merely to secure surface contact between the parts of the various joints.

In the assembled condenser A of the present invention, the tubes 1 and the communicating header chambers 15 provide a surface contact for the circulating of refrigerants eliminating the necessity of providing U-bends in the tubes themselves. Since the header plates and fins are formed by simple stamping or other suitable manufacturing operations, they can be made in large quantities at very little expense by practically automatic machinery. The only manual operation required is that of assembling the fins and tubes in the form D and placing the brazing wires in place, all of which can be done by unskilled labor. The result is a very efficiently constructed condenser that may be sold at a relatively lower price than condensers of similar capacity made by methods heretofore practiced.

Referring to the form of the invention as illustrated in Figure 11, the fins 34 are apertured at 35 to receive the several tubes 1. The fins are notched at 36 to receive brazing wires 37 when the fins are assembled on the tubes. The tubes 1 are assembled in the apertures 35 of the fins 34 with the tube seams 7b down and at 180° from the notches 36. After assembly, brazing wires 38 are laid along the seams 7b of the tubes 1 on the insides of the tubes. It will be observed that the brazing wires 38 are inside the tubes while the brazing wires 37 are outside the tubes.

When the assembly is subjected to heat, the outside wires 37 will melt and weld the fins to the tubes and the inside wires 38 will melt sealing the tube seams 7b and any excess metal from the wires 38 will run through the seams and aid in welding the fins to the tubes adjacent the seams.

I am aware that many changes may be made and numerous details of construction may be varied through a wide range without departing from the principles of this invention and I, therefore, do not purpose limiting the patent granted hereon otherwise than necessitated by the prior art.

The invention is claimed as follows:

1. In a method of making a tube and fin condenser, the steps of rolling a plurality of flat metal sheets into tubular form with the side margins in abutting relation forming seams, providing thin metal fins with notched flanged apertures, assembling the tubes and fins with the tubes extending through the apertures of the fins to hold the tube seams closed and with the fin notches in alignment with the tube seams, placing brazing wires along the tube seams and through the fin notches, and subjecting the assembly to heat to melt the wires thus simultaneously brazing the tube seams together and the fins to the tubes.

2. The method of making a condenser comprising the steps of forming tubes from strip material rolled into cylindrical form with seams extending lengthwise of the tubes, forming heat radiating fins with apertures to receive a plurality of tubes, notching the fins at the apertures thereof, assembling the tubes and fins in condenser form with the fins on edge in parallel relation to hold the tube seams closed and with the notches at the bottom of the apertures and in alignment with the tube seams, introducing lengths of brazing wire through said apertures to lie in said notches and along said seams, and heating the assembled fins and tubes to melt said brazing wire and braze said tube seams together and the flanges to said tubes.

RAY A. SANDBERG.